United States Patent [19]

Mastromoro

[11] Patent Number: 4,508,935
[45] Date of Patent: Apr. 2, 1985

[54] CORDLESS TELEPHONE HAVING A REMOTE CONTROL FUNCTION

[75] Inventor: John F. Mastromoro, Liverpool, N.Y.

[73] Assignee: Samuel S. Strobert, Clay, N.Y.; a part interest

[21] Appl. No.: 500,357

[22] Filed: Jun. 2, 1983

[51] Int. Cl.³ .................... H04M 11/00; H04Q 7/04
[52] U.S. Cl. .................................. 179/2 EA; 179/2 A
[58] Field of Search ................ 179/2 E, 2 EA, 2 EB, 179/2 EC, 2 A, 2 AM, 6.11; 340/825.69, 825.72

[56] References Cited

U.S. PATENT DOCUMENTS 4,392,022  7/1983  Carlson .................. 179/2 EA X

Primary Examiner—Gene Z. Rubinson
Assistant Examiner—W. J. Brady
Attorney, Agent, or Firm—Bruns and Wall

[57] ABSTRACT

A cordless telephone including a base unit and a remote unit that are in wireless communication. The remote unit has a number keyboard whereby code numbers can be entered into the system. A pulse detecting network picks up and identifies the code numbers placed in the remote unit and, in response thereto, controls a variety of electrically responsive devices. The remote control function is carried out without interrupting the voice communication feature of the phone or tying up the subscriber's lines thus providing the user with a degree of mobility not found in similar telephone related control devices.

8 Claims, 5 Drawing Figures

CORDLESS TELEPHONE HAVING A REMOTE CONTROL FUNCTION

BACKGROUND OF THE INVENTION

This invention relates generally to a cordless telephone system and, in particular, to apparatus for providing a cordless telephone with a remote control function without interfering with the voice communication feature of the telephone system or tying up the subscriber's lines.

Many systems have been devised which utilize the bell of a conventional subscriber's telephone to initiate various activities. The following United States patents all disclose bell activated systems of this nature:

| | |
|---|---|
| 3,702,904 | 4,070,549 |
| 3,783,193 | 4,074,078 |
| 3,876,836 | 4,232,195 |

In general, the ring activated systems must be initiated over land lines by calling the base station. This requires that the subscriber's phone be hung up (i.e. not in use) before a remote control function can be initiated. If the phone is in use, there exists no possible way by which a remote control function can be carried out. In an emergency situation this type of delay could be potentially dangerous. Because these systems are dependent on land lines to establish at least a part of the communication link, the mobility of the user is limited. Correspondingly, the applicability of the system is also limited. Finally, many of the ring activated systems require special adaptors that have to be wired directly into existing phone systems which might adversely affect equipment warranties or even violate service contracts.

Other monitoring and control devices have also been devised which, although not ring actuated, carry information over land lines or existing A.C. power lines. The following United States patents disclose systems of this nature:

| | |
|---|---|
| 3,909,618 | 4,095,050 |
| 3,949,172 | 4,130,732 |
| 4,058,678 | 4,348,669 |

Here again, the mobility of the user is greatly restricted to the extent of the data lines and the user is not provided the flexibility of maintaining simultaneous voice communication along with a remote control capability. Accordingly, the usefulness of the device is restricted and the cost of initially installing and later maintaining the equipment is generally high because of the complexity of the equipment involved.

SUMMARY OF THE INVENTION

It is therefore a primary object of the present invention to improve cordless telephones.

It is a further object of the present invention to provide a cordless telephone with a remote control function by which various electrically responsive devices can be regulated without tying up the subscriber's telephone lines.

A still further object of the present invention is to utilize the number keyboard of a cordless telephone to control various types of equipment without interrupting the voice communication feature of the unit.

Another object of the present invention is to remotely control various devices in response to a coded input signal that is generated by entering code numbers into the keyboard of a hand held remote unit of a cordless telephone system.

A still further object of the present invention is to provide people having limited mobility with a relatively inexpensive means for turning electrically responsive appliances on and off while at the same time having the flexibility to communicate via telephone with others.

These and other objects of the present invention are attained by means of a cordless telephone that includes a base unit that is capable of being coupled to an existing telephone system and a remote unit having a number keyboard; the two units being in wireless communication so that coded number signals generated at the remote unit are picked up by the base unit. The base unit contains an in-use light that optically pulses in response to a given number as it is being entered into the keyboard. The pulses are uniformly spaced so that the end of each digit making up a coded number can be clearly identified by the control circuitry which includes an optical encoder for converting the optical pulses to electrical pulses, a counter for keeping count of the incoming pulses, a detector for determining when a count relating to a given digit has ended, a storage device having one or more registers for holding the digits making up a code number and a gating network for applying a control signal to an appropriate load in response to the code number entered into the storage device.

DESCRIPTION OF THE DRAWINGS

For a better understanding of these and other objects of the present invention reference is had to the following detailed description of the present invention which is to be read in conjunction with the accompanying drawings wherein.

DESCRIPTION OF THE INVENTION

Figure 1:
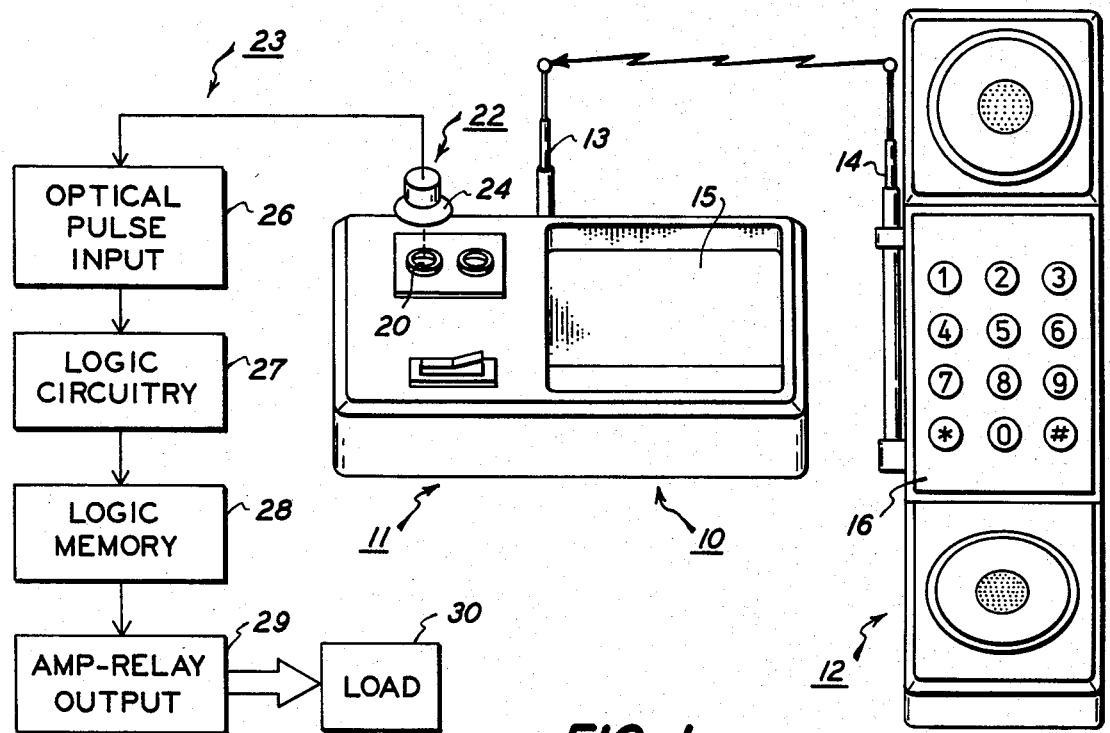
FIG. 1 is a schematic representation of a cordless telephone system embodying the teachings of the present invention.
Figure 3:
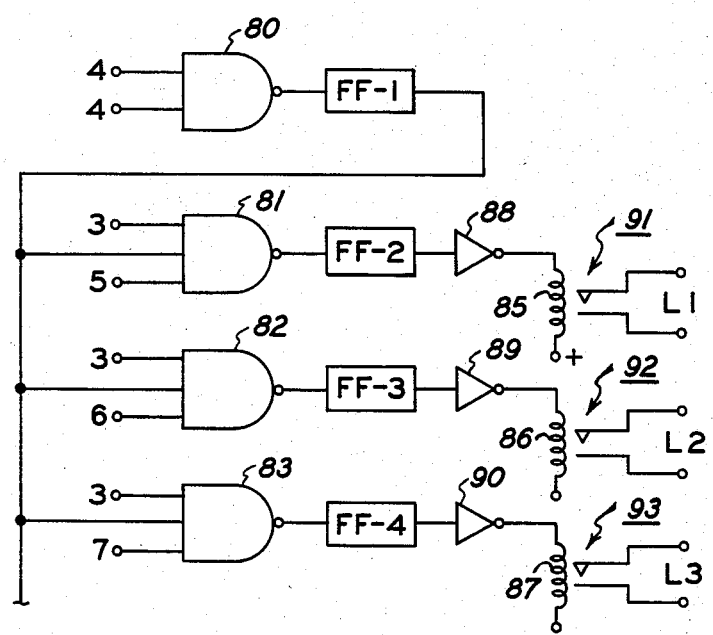
FIG. 3 is a further circuit diagram showing a gating arrangement for placing data from the output terminals of the registers shown in FIG. 2 over selected loads in response to a code number entered into the system.
Figures 2, 2A:
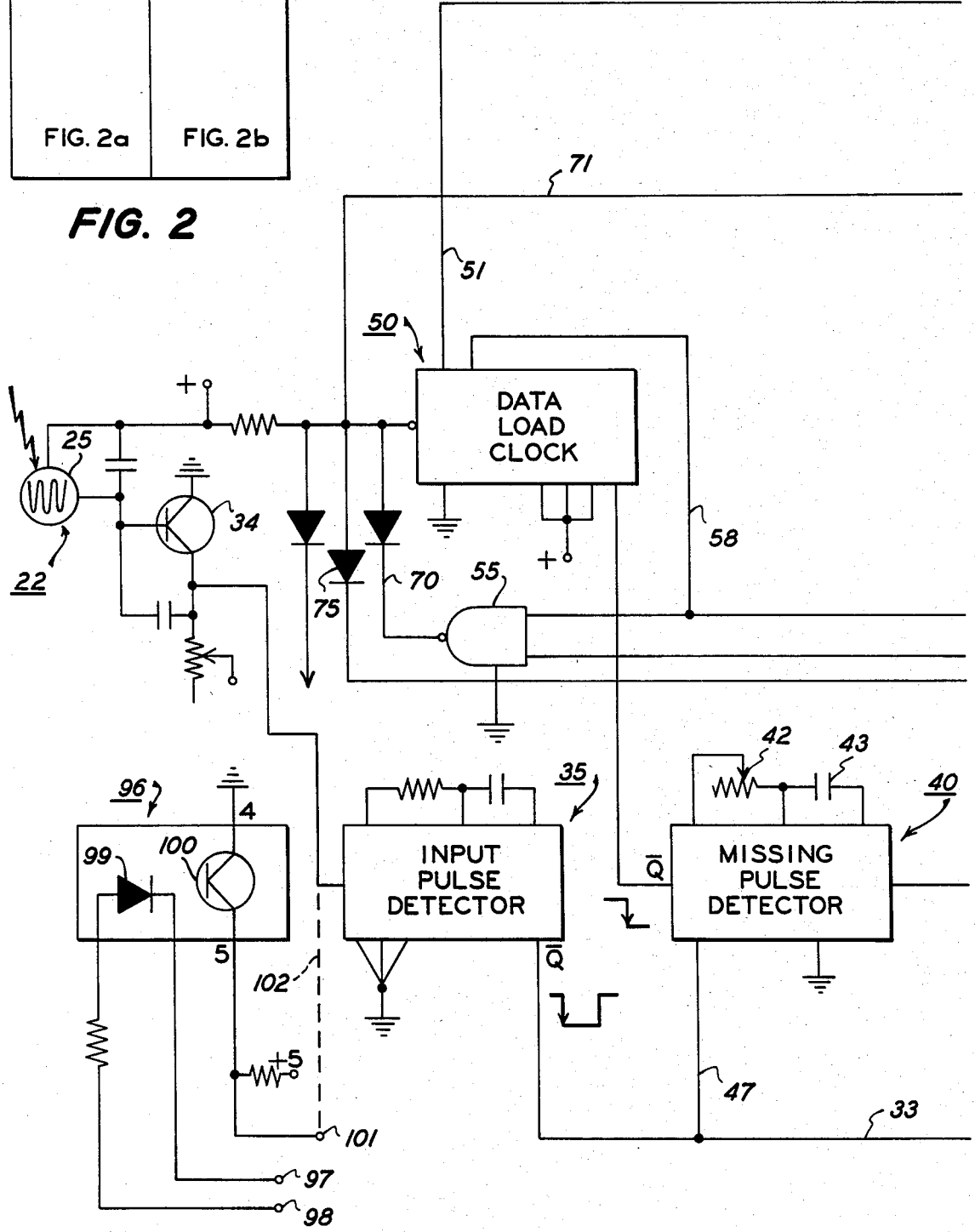
FIG. 2 consists of FIGS. 2a and 2b that are oriented as shown and which together illustrate a circuit diagram of a control unit used in conjunction with the present invention.

The apparatus of the invention shall be explained in greater detail in association with FIGS. 1-3. Referring initially to FIG. 1, there is shown a cordless telephone system, generally referenced 10, that embodies the teachings of the present invention. As is well known in the art, the cordless system includes a base unit 11 and a remote hand held unit 12, both of which are provided with a radio frequency antenna depicted at 13 and 14. For purposes of this disclosure, it is sufficient to understand that the two units are able to communicate with each other over some distance by means of a radio transmitter-receiver network using frequencies specifically allocated for this purpose. The remote unit contains, among other things, a dial mechanism which permits the numbers 0-9 to be dialed or punched into the keyboard 16 which are picked up by the base unit.

Normally in a conventional cordless telephone system of this type, the hand held receiver of the subscriber's telephone is taken off the hook and is placed within a cradle 15 contained in the base unit thereby coupling the cordless system to the subscriber's telephone lines. Entering a multidigit number into the keyboard 16 of the remote unit allows outgoing calls to be initiated from any place within the range of the radio-transmitter of the cordless telephone. The remote unit may be either a dial equipped unit or a push button equipped unit as illustrated in FIG. 1. It should be noted that most, if not all, cordless telephone systems presently in use are equipped with an in-use light 20 (FIG. 1) that is mounted upon the base unit. The light is illuminated any time the cordless telephone is used. Through means of internal circuitry provided by the manufacturer, the light is caused to flash on and off when a number is dialed into the remote unit. For example, if the dialed integer is three, the in-use light will go on-off three times and then return to the normal on-state. The reoccurence rate between optical pulses is set so that a uniform period of time exists between each pulse in a given integer. Because of this uniform spacing between pulses, the integer can be recognized by the pulse reoccurrence frequency.

As will be explained in greater detail below, this built-in recognition feature is herein utilized to generate coded optical signals that are received at the base unit, decoded and utilized to control any suitable type device capable of responding to an electrical input signal. Accordingly, the cordless telephone system of the present invention allows the user to remotely control any number of functions without sacrificing the voice communication features of the system or tying up the telephone lines. This dual capability is especially useful for persons having limited mobility who might be confined to a bed or a wheelchair. The apparatus of the present invention also has industrial applications. For example, it can provide a worker in a railroad yard the ability to keep in constant contact with the control center while, at the same time, allowing him the freedom to walk the yard and carry out switching operations to safely and effectively route traffic through the yard.

Referring once again to FIG. 1, an optical coupling 22 is utilized to connect the telephone in-use light 20 with the logic control circuitry of the present invention. The control circuitry is shown in block diagram form in FIG. 1 and is depicted generally at 23. The coupling contains an interior chamber in which is housed a photosensitive cell 25 (FIG. 2) that is adapted to sense the optical pulses generated by the in-use light when a number is entered into the keyboard of the remote unit. The coupling contains a rubber-like suction cup 24 at the bottom opening to the chamber which is adapted to secure the device in a light-tight condition over the in-use light. Optical pulses generated by the in-use light are initially sent to an optical pulse input unit 26 that accepts the incoming optical pulses and converts them to electrical pulses suitable for processing in the downstream logic circuitry 27. The logic circuit, as will be explained in greater detail below, identifies the integers entered into the keyboard and among other things decodes the numbers and stores the individual digets making up the entered code number in the logic memory 28. When an entire number has been stored in the memory, it is passed on to an amplifier-relay circuit 29 that is adapted to control a predetermined load 30 in response to the selected code number.

It should be noted that the apparatus of the present invention will be described with specific reference to a system adapted to identify and process coded numbers having two digits. The present invention, however, is not limited to this specific embodiment and it should be evident from the disclosure below that it is well within the scope of the present invention to adapt the disclose apparatus to accept coded numbers containing any number of digits within the capacity of the remote unit keyboard.

Figure 2B:
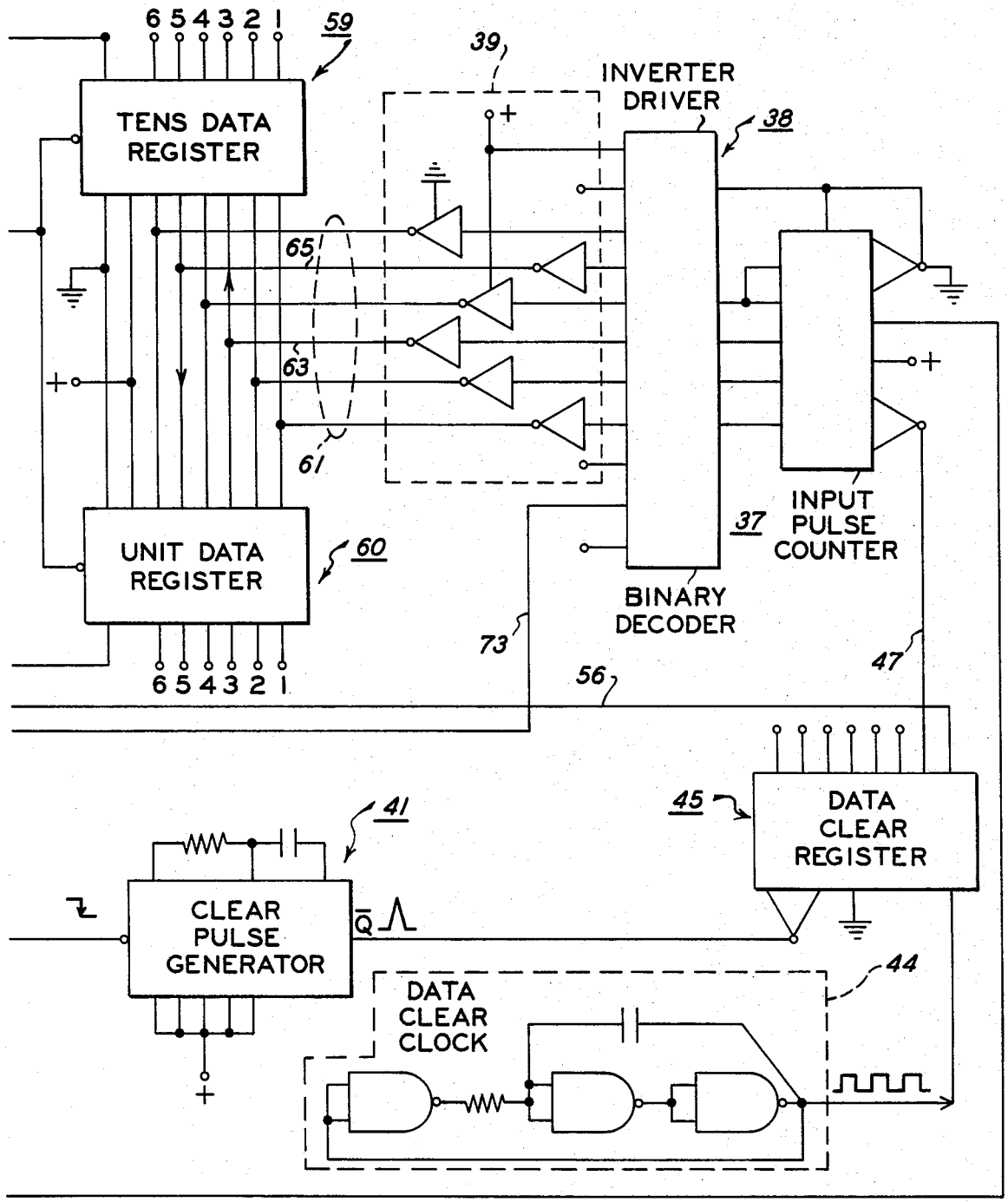

Turning now to FIGS. 2a and 2b which are to be read as noted in FIG. 2, there is shown in greater detail the logic circuitry of the present invention. As previously noted, the optical signals or pulses generated by the telephone in-use light are initially sensed by photosensor 25. The signals are then passed through an optical amplifier 34 and applied to the input of the input pulse detector 35. The pulse detector, in practice, is a monostable multivibrator having a normal high $\overline{Q}$ output of about +5 volts. A Schmidt trigger is contained within the unit that functions to clean up and sharpen the incoming signals. Upon receipt of the incoming signal, the $\overline{Q}$ bar output of the pulse detector goes low (ground potential) to provide an output pulse and then returns to its normal high state.

If for example the digit 3 is entered into the remote unit, three output pulses will be generated by the pulse detector. These pulses are fed via line 33 to an input pulse counter 37. The counter, which is a decade counter, places the incoming count in binary form. The binary count is then passed on to a binary decoder 38 that decodes the number and provides a single output signal indicative of the number. This output signal is produced as a low going pulse which must be inverted before the signal can be accepted by either of two downstream data registers which are herein referred to as the tens data register 59 and the units data register 60. An inverter-driver network, generally referenced 38, is arranged to receive the output signals from the decoder. The signals are inverted and amplified before being placed on a series of address lines 61 feeding into the two registers. In the case of the digit 3, a high state signal will be placed upon address line 63.

The two registers are high transition active devices which means incoming signals must be transitioning from a low to a high state before they are accepted by the registers. In addition, one of the two registers must be enabled before the number is entered. The number placed on the input data lines must therefore be in transition and the proper register enabled before a given integer is accessed.

The registers are enabled in sequence through means of circuitry that include a missing pulse detector 40 and a data load clock 50. As seen with reference to FIG. 2a, the $\overline{Q}$ output signals from the input pulse detector are also fed to the input of the missing pulse detector via line 47. The missing pulse detector is a one shot multivibrator having a normally high $\overline{Q}$ output and a normally low Q output. The $\overline{Q}$ output is coupled directly to the data load clock. In practice, the clock is a data shift register that is triggered only when the clock signal is transitioning from a low state to a high state. Accordingly, the register is not shifted when the $\overline{Q}$ output of the pulse detector initially goes low. As will be explained in greater detail below, the register is shifted only after the missing pulse detector has determined that a first complete integer has been entered in the first tens data register 59. The register is enabled in response to an enabling signal from the data load clock transmitted via line 51.

The missing pulse detector is set to recognize when an incoming count indicative of an entered integer is completed. As noted, at the start of a count, the two outputs of the detector change state. They will remain in this condition as long as the pulse recurrence frequency (PRF) of the incoming signals are within the uniform time period of the in-use light. The time period of the pulse detector is preset using an R-C network made up of potentiometer 42 and capacitor 43. A time period is selected that is slightly greater than the PRF of the in-use light. Accordingly, when the count is completed, the pulse detector will recognize this occurrence and automatically change state back to its original listening condition.

Upon the missing pulse detector verifying that the incoming count relating to the entered integer is completed, the $\overline{Q}$ output of the device switches from a low state back to a high state thus triggering the data load clock. Accordingly, a high going pulse is transmitted to the tens register by means of line 51 thereby enabling the register to accept the last count that was placed upon the register address lines 61. In the present example, the number 3 will be present on the data line 63 and will thus be entered into the tens register 59 and stored on one of the register output lines. As illustrated in the drawings, each of the register output lines is identified by a numbered terminal with the numbers being indicative of the actual number stored in the register. The number 3 entered in the register will be outputted on terminal 3. With the first digit of the two digit code number entered, the system is cleared preparatory to accepting the second digit entered in the remote unit keyboard.

The system is cleared in response to the Q output of the missing pulse detector returning to its normal low condition when the end of count is verified. A clear pulse generator 41 is coupled to the Q output of the missing pulse detector which is also a one shot multivibrator. When the incoming pulse goes low, the missing pulse generator is triggered and a sharp positive going output signal is sent to the data clear register 45. The data clear register, like the data load clock, is a shift register that is adapted to shift the Q output of the clear pulse generator out of the register in response to a clock trigger. As illustrated in FIG. 2b, the clocking signal to the data clear register is furnished by a continually running data clear clock 44. The clock is adapted to provide a 100 millisecond output cycle to the data clear register. The incoming pulse from the clear pulse generator is picked up by the clock and shifted in the register seven times before a clearing signal is placed on output line 47 going to the input pulse counter 37. This places a short 700 millisecond delay into the clearing circuits during which time data is being loaded into the enabled data register 59. Upon receipt of the clearing signal, the input pulse counter is cleared out which also automatically clears the operatively connected binary decoder 38 and inverter driver network 39.

The data clear register continues to shift the high going signal along for a few more milliseconds whereupon a second clearing signal is applied to NAND gate 55 via line 56. The gate, however, at this time is inhibited and will not be enabled until the data load clock 50 is shifted. This will only occur after a second integer is loaded into the units data register 60. Accordingly, the output of the NAND gate remains low and the data clock is not cleared at this time. All other circuits, however, have been cleared and the system now is ready to receive the next integer of the code number, which for explanatory purposes will be 5. The code number will be 35.

As noted above, as the second count begins, the count is recorded by the binary counter 37 and a high going signal indicative of the integer 5 is placed on one of the address lines to the data registers, which in this case is line 65. The missing pulse detector again changes state when the count begins and holds this condition until termination of the count is verified. Upon the missing pulse detector returning to its normal state, a clock signal is sent to the data load clock thus shifting the register and placing a high going output signal on line 58. This, in turn, enables the second units register 60 which accepts the number 5 and stores it upon an appropriate output line. The high going signal on line 58 also enables the NAND gate 55 which now sits and waits until a clearing signal is furnished by the data clear register 45 via line 56.

Again, when the count is complete, a clear pulse is generated at unit, 41 and delivered to the data clear register. As explained above, the positive going pulse is shifted through the register by the 100 millisecond clock 44 to first clear the input counter circuits and then to provide a clearing signal to the NAND gate 55. At this time the gate is enabled and the clear signal is passed through the gate. The gated signal is fed through diode 70 back to the data load clock to clear the register. The gated signal is also applied via line 71 to the data clearing circuits of both data registers 59, 60. The system is now returned to a listening condition ready to receive further coded instructions from the remote telephone unit.

The present system is also furnished with a master clearing feature that will clear all circuits in response to entering a single selected diget into the remote unit. In this case the number 7 has been selected. The entered number is received by the input pulse counter 37 and passed on to the binary decoder which converts the signal to a low going pulse on line 73. Instead of being delivered to the data registers, this particular pulse is passed directly through blocking diode 75 and applied to the clearing circuits of both data registers as well as to the clearing terminal of the data load clock. The master clearing circuit may be used to clear the system in the event an erroneous digit is entered. It also provides a means to clear the system after the phone is hung up. As can be seen, when the phone is hung up, the in-use light goes out which, in turn, generates a count. The count goes through the system and is held in one of the data registers. This must be cleared out when the phone is picked up again. Using a single digit clear furnishes a rapid means to clear out all circuits so that a coded number or numbers can be entered into the system.

With further reference to FIG. 3, there is shown an amplifier-relay network for addressing a series of loads L1-L3 in response to a two digit coded number stored in the data registers. The relay system is also provided with a lock out feature which prevents unauthorized use of the control system.

The various output terminals of the data registers are connected in different combinations to a series of NAND gates 80-83. Gates 81-83 are tied to current sensitive relays 85-87 via inverter amplifiers 88-90 and flip-flops FF-2, FF-3 and FF-4. The relays, when energized, pull in associated normally opened contacts 91-93 thereby either turning on loads L1-L3 which could be any electrically controllable device such as a home appliance or a piece of industrial equipment. De-energizing the relays will turn off the loads.

The NAND gates 81-83 must each receive three positive going inputs before a control signal is passed on to the associated relay. A first input is furnished by a lock out circuit made up of NAND gate 80 and flip-flop FF-1. The output of the flip-flop is normally low and will not go high until it is switched by a negative going signal from the security gate 80. The security gate is only enabled when a given code, in this case 44, is loaded into the data registers. This, in turn, places an enabling signal on the remaining gate thus placing them in condition to accept further coded input signals from the two data registers. The gates will remain enabled until such time as the flip-flops FF-2 through FF-4 change state. The system is again locked out when the number 44 is reentered into the keyboard.

Although only three function gates are shown in FIG. 3, it should be realized that with a two register system of the type herein described, up to nonety-nine such gates could be similarly utilized. The three gate series shown is adapted to respond to the code numbers 35, 36 and 37. Accordingly, when the code number 35 used in the present example is entered into the unlocked system, relay 85 is energized turning on load L1. The relay will remain energized until such time as the same code number, 35, is reentered whereupon the load L1 will be turned off.

Although, as already indicated, the base unit of all cordless telephones come equipped with an in-use light capable of providing recognizable optical pulses suitable for use in the present invention, there may be occasions wherein the user may wish to hard wire the present system directly into the phone unit. In this case an optical isolator unit 96 (FIG. 2a) may be utilized having a pair of input terminals 97 and 98 that can be wired into the phone circuitry at any point having an on-off condition that is analogous to that of the in-use light. The on-off input is used to flash a light emitting diode 99. The flashes are picked up by optical amplifier 100 and brought out to a terminal 101. As seen in FIG. 2a, the output terminal 101 is connected directly to the input of the input pulse detector 35 via dotted line 102 and thus serves the same input function as the previously mentioned photosensor 25.

While this invention has been described with reference to the structure disclosed herein, it is not confined to the details set forth and this application is intended to cover any modifications or changes as may come within the scope of the following claims.

I claim:

1. In a cordless telephone system of the type wherein a base unit is capable of being coupled to existing telephone lines, apparatus for remotely controlling at least one load in response to a coded input signal without interrupting the telephone voice communication, said apparatus including
   a remote unit in wireless communication with the base unit, said remote unit having a keyboard for entering digits into the system whereby code numbers representing selected loads can be initiated,
   a pulse generator contained in the base unit that is responsive to the keyboard entries for providing a pulsed output signal containing a given number of pulses for each enterable digit whereby each digit is recognizable,
   counter means for counting the number of pulses in said output signal from said generator, and providing a coded control signal indicative of a number entered into the keyboard, and
   gating means that is enabled in response to the coded control signal to energize a selected load.

2. The apparatus of claim 1 that includes a storage means for accepting and holding coded control signals from the counter means, said storage means having a separate register for each digit contained in the code number entered into the keyboard.

3. The apparatus of claim 2 that further includes a detector means for identifying the beginning and the end of each pulsed output signal and providing an enabling signal to each of the registers whereby digits making up each control signal are placed in separate registers.

4. The apparatus of claim 3 that further includes a first clearing means responsive to said detector means for clearing the registers after the gating means is enabled, and a second clearing means also responsive to said detector means for clearing the counter after each digit is placed in said storage means.

5. The apparatus of claim 3 wherein said detector means is a missing pulse detector arranged to identify the time period between said pulsed output signals and change state to generate an output when the period is exceeded for enabling the storage means to accept the last count.

6. The apparatus of claim 4 wherein the storage means contains two registers and the gating means contains a series of gates arranged to receive an output from each register in order to apply a control signal to an associated load.

7. The apparatus of claim 6 further including a lock-out means associated with each gate to inhibit the gates until such time as a predetermined lock-out code number is entered into the keyboard.

8. The apparatus of claim 4 that further includes a master clearing circuit for automatically clearing both the registers and the counter when a single digit master number is entered into the keyboard.

* * * * *